United States Patent
Tseng et al.

(10) Patent No.: US 8,559,962 B2
(45) Date of Patent: Oct. 15, 2013

(54) METHOD AND APPARATUS FOR IMPROVING RECONFIGURATION PROCEDURE FOR SCHEDULING REQUEST

(75) Inventors: Li-Chih Tseng, Taipei (TW); Meng-Hui Ou, Taipei (TW); Yu-Hsuan Guo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 274 days.

(21) Appl. No.: 12/629,854

(22) Filed: Dec. 2, 2009

(65) Prior Publication Data

US 2010/0184445 A1 Jul. 22, 2010

Related U.S. Application Data

(60) Provisional application No. 61/146,638, filed on Jan. 22, 2009.

(51) Int. Cl.
*H04W 72/00* (2009.01)

(52) U.S. Cl.
USPC ........................................ 455/450; 455/452.1

(58) Field of Classification Search
USPC ............. 455/450, 452.1–452.2, 435.1–435.3, 455/436–442, 424; 370/328–329, 336, 341, 370/347–348
See application file for complete search history.

(56) References Cited

U.S. PATENT DOCUMENTS

| | | | |
|---|---|---|---|
| 2008/0232333 A1* | 9/2008 | Jeong et al. | 370/336 |
| 2008/0316959 A1* | 12/2008 | Bachl et al. | 370/329 |
| 2009/0175159 A1* | 7/2009 | Bertrand et al. | 370/203 |
| 2009/0176502 A1* | 7/2009 | Kuo | 455/450 |
| 2009/0196236 A1* | 8/2009 | Cai et al. | 370/329 |
| 2009/0238121 A1* | 9/2009 | Kotecha | 370/329 |
| 2009/0291701 A1* | 11/2009 | Zetterman et al. | 455/509 |
| 2010/0111067 A1* | 5/2010 | Wu | 370/345 |

FOREIGN PATENT DOCUMENTS

| | | | |
|---|---|---|---|
| JP | 2008079192 A | 4/2008 | |
| KR | 1020070121576 A | 12/2007 | |

OTHER PUBLICATIONS

Huawei: "CR for discussion on field name for common and dedicated IE", 3GPP TSG-RAN WG2 Meeting #64bis, R2-090411, Jan. 12-16, 2009, XP050322364, Ljubljana, Slovenia.*
3GPP, Draft 3GPP TS 36.321 V8.4.0 (Dec. 2008), "E-UTRA MAC Protocol specification (Release 8)", Dec. 2008.*
Office Action on corresponding KR Patent Application No. 10-2009-0125372 from KIPO dated Apr. 26, 2011.
3GPP, R2-090127, "Clarification on MAC reconfiguration and MAC reset", Jan. 2009.
Nokia Siemens Networks, Nokia Corporation: "Usage of RRC Parameters", 3GPP TSG-RAN2 Meeting #64bis, R2-090814, Jan. 12-16, 2009, pp. 1-17, XP002571811, Ljubljana, Slovenia.
HTC Corporation, "Pending SR with SPS", 3GPP TSG-RAN WG2 #63bis, R2-085887, Sep. 29-Oct. 3, 2008, XP050320608, Prague, Czech.

(Continued)

*Primary Examiner* — Brandon Miller
(74) *Attorney, Agent, or Firm* — Blue Capital Law Firm, P.C.

(57) ABSTRACT

The present invention provides a method for improving a reconfiguration procedure for Scheduling Request (SR) in a user equipment (UE) of a wireless communication system. The method includes steps of receiving an upper layer request for reconfiguring an SR parameter of the UE, and applying new configuration provided by the upper layer request to the SR parameter when an SR is triggered and there is no other SR pending in the UE.

12 Claims, 4 Drawing Sheets

(56) References Cited

OTHER PUBLICATIONS

3GPP TSG-RAN2 #64 meeting, Prague, Czech Republic, Nov. 10-14, 2008 (R2-086569).
3GPP TSG-RAN2 Meeting #65, Athens, Greece, Feb. 9-13, 2009 (R2-091656).
3GPP TSG-RAN2 Meeting #65, Athens, Greece, Feb. 9-13, 2009 (R2-091676).
3GPP TSG-RAN WG2 #65, Athens, Greece, Feb. 9-13, 2009 (R2-091281).
e-IPR Claim Table—2009—W08 (980018D2_Ryan_Richie_Roger)_V0.3.
3GPP TSG-RAN2 Meeting #65, Athens, Greece. Feb. 9-13, 2009 (R2-091283).
Office Action on corresponding foreign application (JP2009-284495) from KIPO dated Nov. 29, 2011.

* cited by examiner

METHOD AND APPARATUS FOR IMPROVING RECONFIGURATION PROCEDURE FOR SCHEDULING REQUEST

CROSS REFERENCE TO RELATED APPLICATIONS

This application claims the benefit of U.S. Provisional Application No. 61/146,638, filed on Jan. 22, 2009 and entitled "Method and Apparatus for Improving MAC Reconfiguration in a Wireless Communication System", the contents of which are incorporated herein by reference.

BACKGROUND OF THE INVENTION

1. Field of the Invention

The present invention relates to a method and apparatus for improving a reconfiguration procedure for Scheduling Request, and more particularly, to a method and apparatus for improving a reconfiguration procedure for Scheduling Request in a user equipment (UE) of a wireless communication system, so as to appropriately reconfigure parameters corresponding to a Scheduling Request procedure.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE system, based on 3GPP technical specification TS 36.321 V8.4.0, when the UE has new uplink data to transmit such as a Regular Buffer Status Report (BSR) and there is no Uplink Shared Channel (UL-SCH) resource for new transmission available, the UE shall trigger a Scheduling Request (SR) to request the network to allocate uplink resources . In such a situation, if the UE has configured valid Physical Uplink Control Channel (PUCCH) resources for SR, the SR is transmitted on PUCCH. Otherwise, such as the UE has no configured PUCCH resources for SR or the configured PUCCH resources for SR are invalid, for example, the UE shall initiate a Random Access Procedure to request the network to allocate uplink resources.

When an SR is triggered, it shall be considered as pending until it is cancelled. Besides, if an SR is triggered and there is no other SR pending, the UE shall set a counter SR_COUNTER, which is utilized for counting the number of SR transmission times in the SR procedure, to 0. That is to initialize the counter SR_COUNTER.

As long as one SR is pending, if the UE has a valid PUCCH resource for SR transmission, the UE shall periodically transmit the SR on PUCCH until an UL-SCH resource for a new transmission is received or the number of SR transmissions reaches to a pre-defined parameter dsr-TransMax. Whenever the SR is transmitted, the counter SR_COUNTER is incremented by 1. If the number of SR transmissions reaches to the pre-defined parameter dsr-TransMax, it indicates uplink transmission of the UE may have some problem, such as the PUCCH resources for SR become invalid (probably due to poor signal quality or improper power settings) or the UE loses synchronization on uplink timing, and thus the SR sent on PUCCH cannot be successfully received by the network. In this case, the UE shall cancel all pending SR(s) i.e. stop the SR transmission, release uplink resources such as all configured PUCCH resources and SRS resources for transmitting uplink Sounding Reference Signals, and initiate a Random Access procedure. Besides, when the UE receives an UL-SCH resource for a new transmission, all pending SR(s) shall be cancelled.

On the other hand, upper layers such as Radio Resource Control (RRC) layer would request the UE to perform a reconfiguration procedure to reconfigure parameters corresponding to the SR procedure, such as dsr-TransMax, sr-PUCCH-ResourceIndex and sr-ConfigurationIndex, for example. According to current specifications, if reconfiguration is requested by upper layers, the UE shall immediately apply new configurations received from the upper layers.

However, for some parameters such as SR parameters, immediately applying the new configurations received from the upper layers may cause UE errors. For example, when the UE has pending SR (s) and reconfiguration is requested by the upper layers, if the UE immediately applies the new configurations to the SR parameter dsr-TransMax, the counter SR_COUNTER may thus exceed the parameter dsr-TransMax, resulting in that the UE unnecessarily releases uplink resources and initiates a Random Access procedure. Therefore, there is a need to improve the reconfiguration procedure for SR.

SUMMARY OF THE INVENTION

It is therefore an objective of the present invention to provide a method and apparatus for improving a reconfiguration procedure for Scheduling Request (SR) in a user equipment (UE) of a wireless communication system, so as to appropriately reconfigure SR related parameters.

According to the present invention, a method for improving a reconfiguration procedure for Scheduling Request (SR) in a user equipment (UE) of a wireless communication system is disclosed. The method includes steps of receiving an upper layer request for reconfiguring an SR parameter of the UE; and applying new configuration provided by the upper layer request to the SR parameter when an SR is triggered and there is no other SR pending in the UE.

According to the present invention, a communications device for improving a reconfiguration procedure for Scheduling Request (SR) in a user equipment (UE) of a wireless communication system is disclosed. The communications device includes a processor for executing a program, and a memory, coupled to the processor, for storing the program. The program includes steps of receiving an upper layer request for reconfiguring an SR parameter of the UE; and applying new configuration provided by the upper layer request to the SR parameter when an SR is triggered and there is no other SR pending in the UE.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
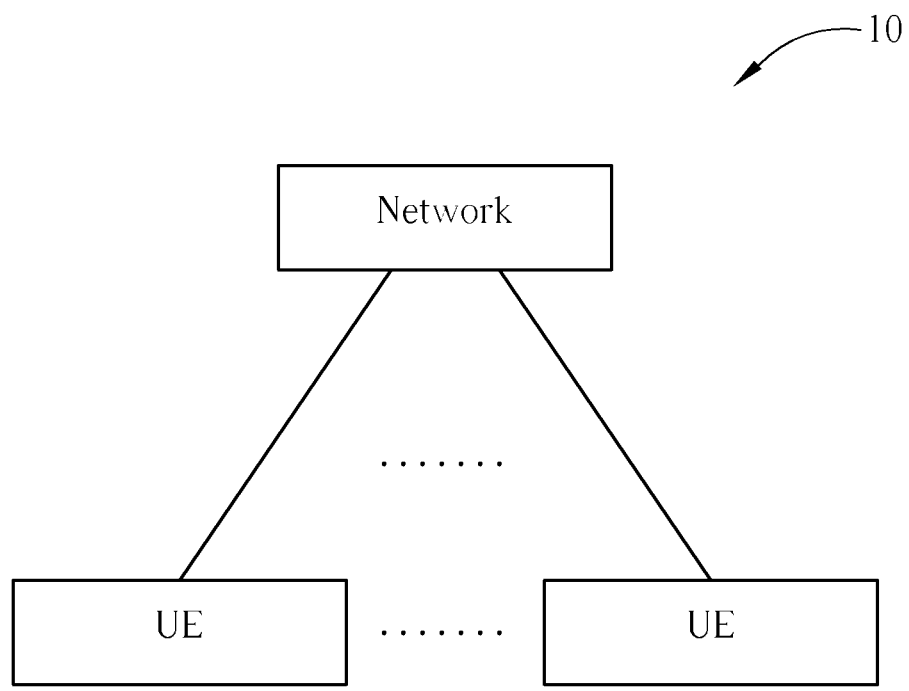
FIG. 1 is a schematic diagram of a wireless communications system.

Please refer to FIG. 1, which illustrates a schematic diagram of a wireless communications system 10. The wireless communications system 10 is preferred to be a Long Term Evolution (LTE) system, and is briefly composed of a network and a plurality of user equipments (UEs). In FIG. 1, the network and the UEs are simply utilized for illustrating the structure of the wireless communications system 10. Practically, the network may comprise a plurality of base stations (Node Bs), radio network controllers and so on according to actual demands, and the UEs can be devices such as mobile phones, computer systems, etc.

Figure 2:
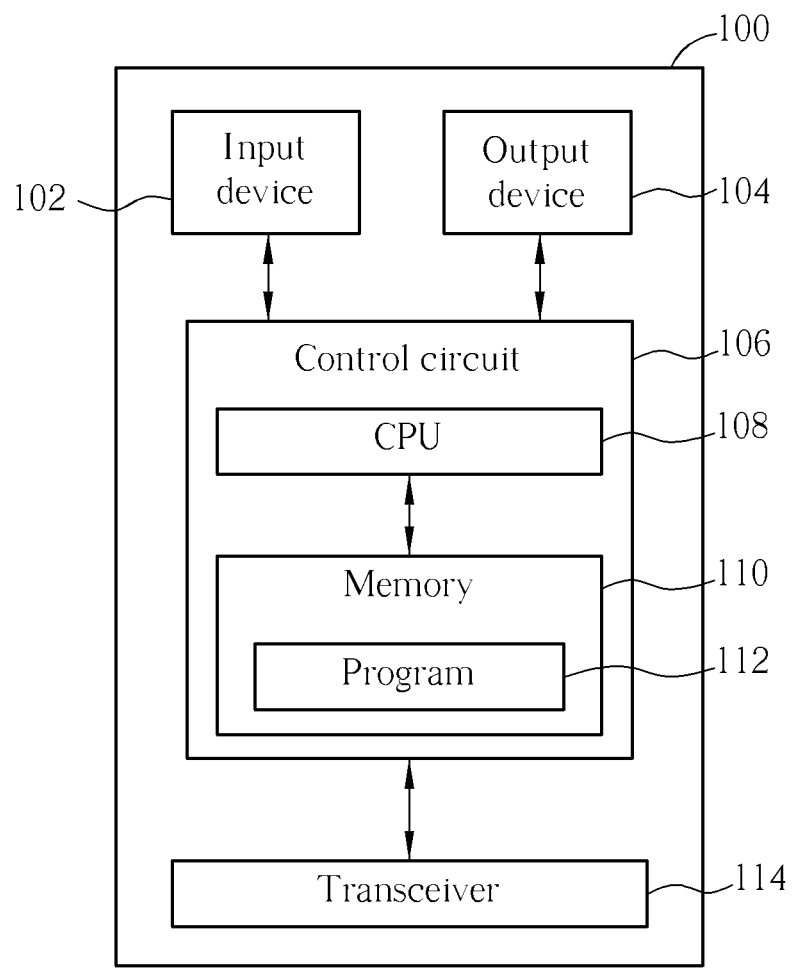
FIG. 2 is a function block diagram of a wireless communications device.

Please refer to FIG. 2, which is a functional block diagram of a communications device 100 in a wireless communications system. The communications device 100 can be utilized for realizing the UEs in FIG. 1, and the wireless communications system is preferably the LTE system. For the sake of brevity, FIG. 2 only shows an input device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
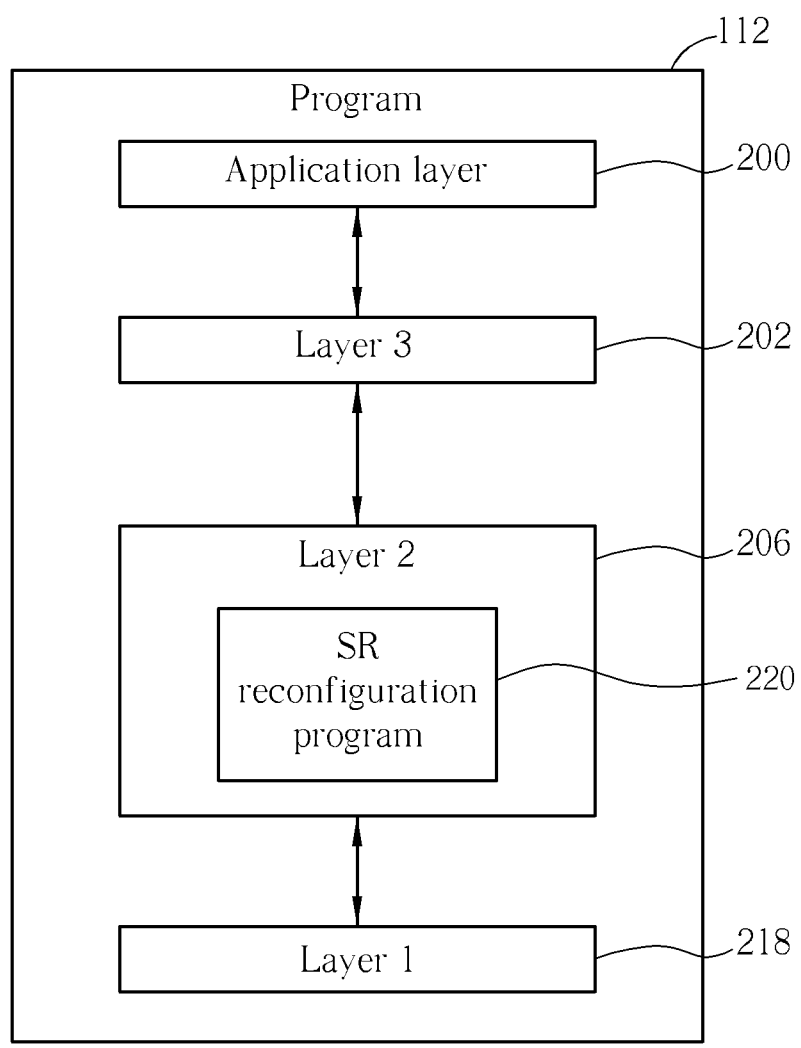
FIG. 3 is a diagram of program of FIG. 2.

Please continue to refer to FIG. 3. FIG. 3 is a schematic diagram of the program 112 shown in FIG. 2. The program 112 includes an application layer 200, a Layer 3 202, and a Layer 2 206, and is coupled to a Layer 1 218. The Layer 3 202 includes a Radio Resource Control (RRC) layer, and is used for performing radio resource control. The Layer 2 206 includes a Radio Link Control (RLC) layer and a Medium Access Control (MAC) layer, and is used for performing link control. The Layer 1 218 is used for performing physical connection.

In LTE system, when the UE has new uplink data to transmit such as a Regular Buffer Status Report (BSR) and there is no Uplink Shared Channel (UL-SCH) resource for new transmission available, the UE shall trigger a Scheduling Request (SR) to request the network to allocate uplink resources. Besides, upper layers such as the RRC layer would request the UE to perform a reconfiguration procedure to reconfigure SR related parameters. In such a situation, the embodiment of the present invention provides an SR reconfiguration program 220 for improving SR parameter reconfiguration operations, so as to prevent the UE from doing unnecessary actions, such as releasing uplink resources and initiating a Random Access procedure, for example.

Figure 4:
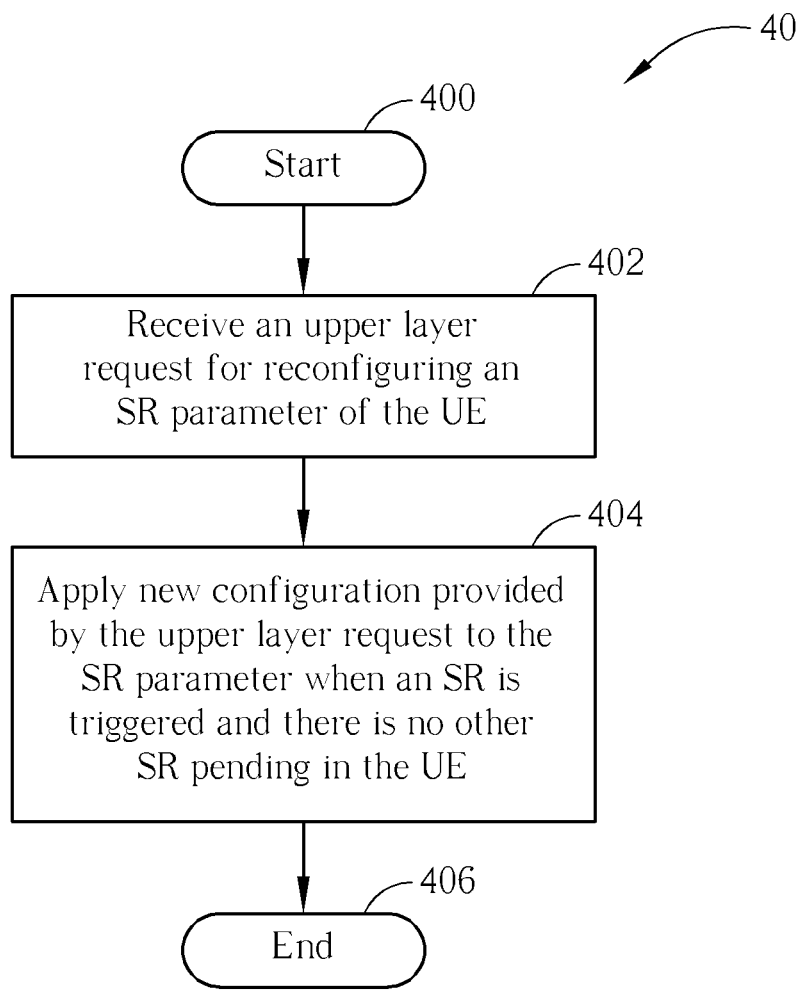
FIG. 4 is a flowchart of a process according to an embodiment of the present invention.

Please refer to FIG. 4, which is a flow chart of a process 40 according to an embodiment of the present invention. The process 40 is used for improving a reconfiguration procedure for Scheduling Request (SR) in a UE of the wireless communication system 10. The process 40 can be compiled into the SR reconfiguration program 220, and includes the following steps:

Step 400: Start.

Step 402: Receive an upper layer request for reconfiguring an SR parameter of the UE.

Step 404: Apply new configuration provided by the upper layer request to the SR parameter when an SR is triggered and there is no other SR pending in the UE.

Step 406: End.

According to the process 40, the UE first receives an upper layer request for reconfiguring an SR parameter of the UE. Then, when an SR is triggered and there is no other SR pending in the UE, the UE applies new configuration provided by the upper layer request to the SR parameter.

That means, when the upper layer requests the UE to reconfigure the SR parameter, the UE applies the new configuration provided by the upper layer only when next time, the SR is triggered and there is no other SR pending in the UE, instead of applying the new configuration immediately as the prior art does. Therefore, when the UE has pending SR(s), the embodiment of the present invention can prevent the SR parameter from being suddenly changed due to reconfiguration, such that the UE would not release uplink resources and initiates a Random Access procedure unnecessarily.

Please note that, according to current specifications, if an SR is triggered and there is no other SR pending, the UE shall set a counter SR_COUNTER, which is utilized for counting the number of SR transmission times in the SR procedure, to 0. That is to initialize the counter SR_COUNTER. In other words, if the upper layer requests the UE to reconfigure the SR parameter, the UE according to the embodiment of the present invention applies the new configurations provided by the upper layer to the SR parameter only when the counter SR_COUNTER is initialized.

Preferably, the said SR parameter can be a parameter dsr-TransMax, a parameter sr-PUCCH-ResourceIndex, or a parameter sr-ConfigIndex. The parameter dsr-TransMax is utilized for indicating a maximum of transmission times of the SR, the parameter sr-PUCCH-ResourceIndex is utilized for indicating a Physical Uplink Control Channel (PUCCH) resource of th e SR, and the parameter sr-ConfigIndex is utilized for indicating a transmission periodicity and a subframe offset of the SR.

For example, when the UE has pending SR (s), if the upper layer requests the UE to reconfigure the SR parameter, the UE according to the embodiment of the present invention can only apply the new configurations to the parameter dsr-TransMax when the counter SR_COUNTER is initialized next time. As a result, the embodiment of the present invention can prevent the value of the counter SR_COUNTER from suddenly exceeding the parameter dsr-TransMax due to reconfiguration of the SR parameter, which causes the UE unnecessarily releasing uplink resources and initiating a Random Access procedure.

In summary, the embodiment of the present invention provides the method for improving the reconfiguration procedure for SR in a UE of a wireless communication system, to appropriately reconfigure parameters corresponding to a Scheduling Request procedure, such that the UE would not unnecessarily release uplink resources and initiates a Random Access procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving a reconfiguration procedure for Scheduling Request (SR) in a user equipment (UE) of a wireless communication system, the method comprising:
receiving an upper layer request for reconfiguring an SR parameter of the UE when a first SR is pending; and
applying new configuration provided by the upper layer request to the SR parameter when the first SR is no longer pending and a second SR is triggered in the UE.

2. The method of claim 1, wherein the SR parameter is a parameter sr-PUCCH-ReourceIndex, for indicating a Physical Uplink Control Channel (PUCCH) resource of an SR.

3. The method of claim 1, wherein the SR parameter is a parameter sr-ConfigIndex, for indicating a transmission periodicity and a subframe offset of an SR.

4. The method of claim 1 wherein the SR pammeter is a parameter dsr-TransMax, for indicating a maximum of transmission times of an SR.

5. The method of claim 1 further comprising:
initializing a counter of the SR when the first SR is no longer pending and the second SR is triggered in the UE, wherein the counter is utilized for counting a number of transmission times of an SR.

6. The method of claim 1, wherein the upper layer request is generated by a Radio Resource Control (RRC) layer.

7. A communication device for improving a reconfiguration procedure for Scheduling Request (SR) in a user equipment (UE) of a wireless communication system, the communication device comprising:
a processor for executing a program; and
a memory coupled to the processor for storing the program:
wherein the program comprises:
receiving an upper layer request for reconfiguring an SR parameter of the UE when a first SR is pending; and
applying new configuration provided by the upper layer request to the SR parameter when the first SR is no longer pending and a second SR is triggered in the UE.

8. The communication device of claim 7, wherein the SR parameter is a parameter sr-PUCCH-ResourceIndex, for indicating a. Physical Uplink control Channel (PUCCH) resource of an SR.

9. The communication device, of claim 7, wherein the SR parameter is a parameter sr-ConfigIndex, for indicating a transmission periodicity and a subframe offset of an SR.

10. The communication device of claim 7, wherein the SR parameter is a parameter dsr-TransMax, for indicating a maximum of transmission times of an SR.

11. The communication device of claim 7, wherein the program further comprises:
initializing a counter of the SR when the first SR is no longer pending and the second SR is triggered in the UE, wherein the counter is utilized for counting a number of transmission times of an SR.

12. The communication device of claim 7, wherein the upper layer request is generated by a Radio Resource Control (RRC) layer.

* * * * *